United States Patent
Berstis et al.

(10) Patent No.: US 6,236,936 B1
(45) Date of Patent: May 22, 2001

(54) MAINTAINING A DESIRED SEPARATION OR DISTRIBUTION IN A MOVING CLUSTER OF MACHINES USING A TIME MULTIPLEXED GLOBAL POSITIONING SYSTEM

(75) Inventors: Viktors Berstis, Austin; Joel Leslie Smith, Round Rock, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/239,333

(22) Filed: Jan. 28, 1999

(51) Int. Cl.$^7$ .................................................. G06F 7/00
(52) U.S. Cl. .................... 701/213; 340/903; 340/988; 342/357.08; 701/300
(58) Field of Search .................................. 701/207, 208, 701/213, 300, 116–120, 301; 340/903, 945, 961, 963, 988–992, 995, 825.36, 825.49; 342/29–31, 36, 357.01, 357.06–357.09, 357.12, 357.13; 348/113, 116–118; 375/130, 347

(56) References Cited

U.S. PATENT DOCUMENTS

| | | |
|---|---|---|
| Re. 35,498 | 4/1997 | Barnard . |
| 4,835,537 | 5/1989 | Manion . |
| 5,325,302 | 6/1994 | Izidon et al. . |
| 5,467,282 | 11/1995 | Dennis . |
| 5,506,587 | 4/1996 | Lans . |
| 5,519,403 | 5/1996 | Bickley et al. . |
| 5,568,152 | 10/1996 | Janky et al. . |
| 5,627,546 | 5/1997 | Crow . |
| 5,636,123 | 6/1997 | Rich et al. . |
| 5,646,630 | 7/1997 | Sheynblat et al. . |
| 5,646,844 | 7/1997 | Gudat et al. . |
| 5,751,246 | 5/1998 | Hertel . |
| 5,752,218 | 5/1998 | Harrison et al. . |
| 5,777,580 | 7/1998 | Janky et al. . |
| 5,798,726 | 8/1998 | Schuchman et al. . |
| 5,805,200 | 9/1998 | Counselman, III . |
| 5,839,080 | 11/1998 | Muller et al. . |
| 5,933,099 | * 8/1999 | Mahon ................................. 340/961 |
| 5,982,324 | * 11/1999 | Watters et al. .................. 342/357.06 |
| 5,983,161 | * 11/1999 | Lemelson et al. ................... 701/301 |

\* cited by examiner

*Primary Examiner*—William A. Cuchlinski, Jr.
*Assistant Examiner*—Edward Pipala
(74) *Attorney, Agent, or Firm*—Jeffrey S. LaBaw

(57) ABSTRACT

A method for maintaining a desired distribution of a moving cluster of machines is described. At each machine, the location of the machine is determined via a global positioning system calculation. Next, each machine determines a cell corresponding to the determined location. Each machine broadcasts a message at a time slice allocated for the cell. A controller, either centrally located or on the machines themselves, receives the broadcasted messages from a plurality of machines. The controller uses the received broadcasted messages to determine the locations of the plurality of machines. By matching the determined locations of the machines against a desired distribution of machines within the cluster, it determines whether the determined locations adequately match the desired distribution. If not, it issuing commands to respective machines to bring the cluster into compliance with the desired distribution.

15 Claims, 7 Drawing Sheets

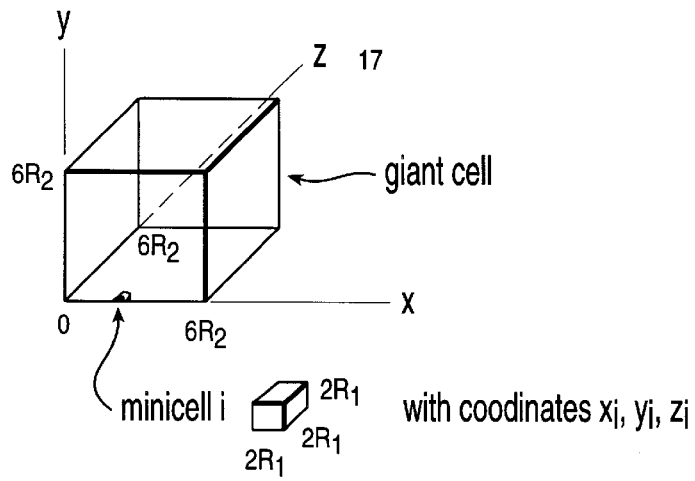

n = 6R$_2$ ÷ 2R$_1$ = number of mini cells along each axis
n$^3$ = number of minicells in a giant cell
let m be number of frequency channels
K = n$^3$ ÷ n = number of time slots $$j = f\left(\frac{X_i}{6R_2}\right).n + f\left(\frac{Y_i}{6R_2}\right).n^2 + f\left(\frac{Z_i}{6R_2}\right).n^3 = \text{cell number for minicell } i \text{ within giant cell}$$

where $f\left(\frac{a}{b}\right)$ is remainder of a ÷ b
j ÷ k discarding remainder is the frequency channel number
remainder of j ÷ k is time slot number m.

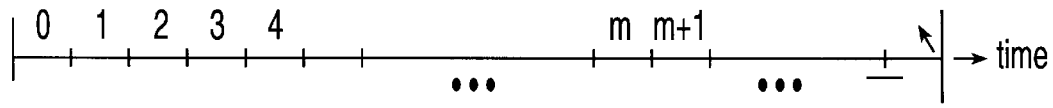

FIG. 2B

MAINTAINING A DESIRED SEPARATION OR DISTRIBUTION IN A MOVING CLUSTER OF MACHINES USING A TIME MULTIPLEXED GLOBAL POSITIONING SYSTEM

BACKGROUND OF THE INVENTION

This invention relates generally to determining position by electromagnetic radiation. More particularly, the invention relates to an improved system for using sensed position data to maintain a desired distribution of machines.

As the world becomes a more crowded and busy place, there are an increasing number of machines, on land, on sea and in the air. The machines perform a variety of functions and many are man driven vehicles. Many of the machines are groups of like machines which are traveling through space. For example, fleets of oil tankers may voyage from port to port on the sea. Floating weather detection buoys or individual bomblets within a cluster bomb are other examples. As the group of machines moves, it would be desirable to manage the distribution of these machines so that they maintain a desired distribution with respect to each other. The desired distribution of machines may be for a variety of purposes such as collision avoidance, maintaining a minimum separation for sampling purposes or distributing death onto thine enemy. The desired distribution need not be uniform across the cluster as certain areas may require greater service or attention.

The Global Positioning System (GPS) is currently the most precise positioning system generally available to the general public and has significantly dropped in price in recent years. The GPS comprises a network of 24 satellites orbiting the earth. Each satellite transmits a ranging signal modulated on a 1.575 Ghz carrier. By monitoring the signal from a plurality of satellites, a GPS receiver can determine its position, i.e. latitude, longitude and altitude, to an accuracy of about 100 meters. In general, this degree of accuracy would be attained if signals from three or four of the GPS satellites were received. More accurate GPS signals are available to the military. Differential GPS, also available to the public, is more accurate than standard GPS, but requires an additional land based transmitter and special permission from the government.

Many of the uses for GPS-based systems known to the Applicants are in the realm of mapping or collision avoidance applications. Notably one such GPS-based system is taught by "Traffic Alert and Collision Avoidance Coding System", U.S. Pat. No. 5,636,123 to Rich et al. In the Rich system, the airspace is divided up into a grid of volume elements. A collision avoidance signal is transmitted wherein the carrier signal is modulated by a psuedonoise code which is function of the volume element in which the aircraft is located. Each aircraft only tracks collision avoidance signals from vehicles in its own and immediate surrounding cells. Based on the calculated paths of the aircraft, a warning of an impending collision can be provided to the pilot.

The Applicants have proposed an improved tracking and collision avoidance system in "Time Multiplexed Global Positioning System Cell Location Beam System" Ser. No. 09/239,335 filed the same day as the present application, is commonly assigned and is hereby incorporated by reference. Although the invention described in the incorporated application does not address the problems of maintaining the distribution of machines as they move throughout their environment, it does share an overall cell structure with the preferred embodiment of the present invention.

This invention solves these and other important problems.

SUMMARY OF THE INVENTION

A method for maintaining a desired distribution of a moving cluster of machines is described. At each machine, the location of the machine is determined via a global positioning system calculation. Next, each machine determines a cell corresponding to the determined location. Each machine broadcasts a message at a time slice allocated for the cell. A controller, either centrally located or on the machines themselves, receives the broadcasted messages from a plurality of machines. The controller uses the received broadcasted messages to determine the locations of the plurality of machines. By matching the determined locations of the machines against a desired distribution of machines within the cluster, it determines whether the determined locations adequately match the desired distribution. If not, it issuing commands to respective machines to bring the cluster into compliance with the desired distribution.

BRIEF DESCRIPTION OF THE DRAWINGS

The foregoing features, advantages and aspects of the invention will be better understood with reference to following detailed description which describes the accompanying drawings wherein:

FIG. 2B shows a minicell formula.

DETAILED DESCRIPTION OF THE DRAWINGS

Figure 1:
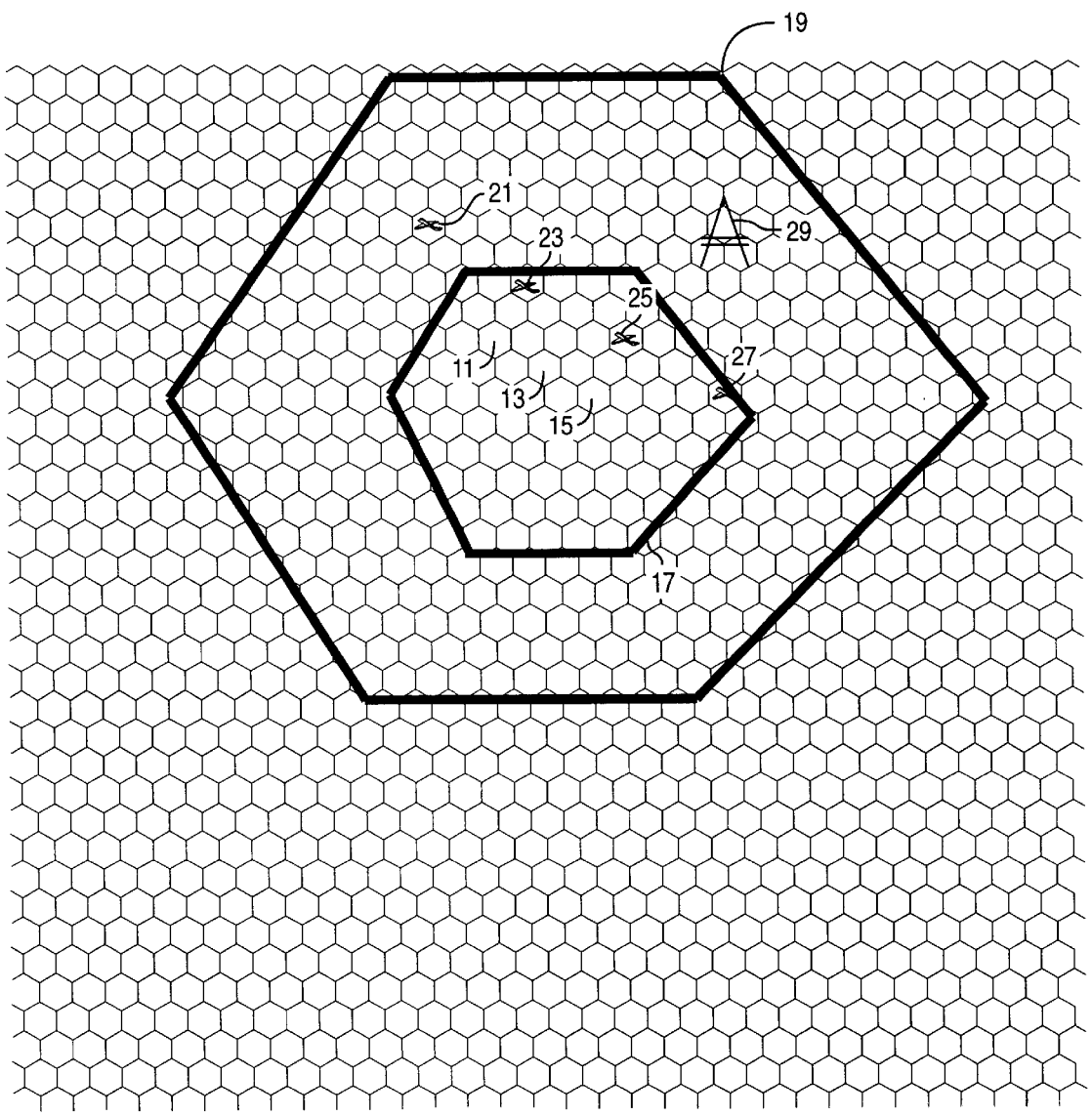
FIG. 1 is a pictorial view of a plurality of oil tankers operating on a surface which has been partitioned into a hierarchy of two dimensional cells according to the present invention.

As mentioned above, many vehicles such as automobiles, aircraft and boats have GPS receivers. The Time Multiplexed GPS based Cell Location Beacon System (hereinafter "TCELL") proposed by this invention makes use of the GPS receiver for determining the location of a vehicle or other machine. The TCELL system also uses the GPS clock to avoid transmission collisions in time. The embodiment shown in FIG. 1 shows a two dimensional ocean surface divided into a hierarchically organized set of cells. For ease in illustration, the cells are shown as hexagons. However, the surface can be divided into any shape which can be tightly packed, i.e. there is no space which is not allocated to a cell. In fact, more nearly spherical shapes are preferred. Also, for ease of illustration, only a limited portion of the ocean is shown. Potentially, the TCELL system aboard each machine would contain information relating to a large area, e.g., the earth's surface, although there are many applications in which only a limited amount of area need be known. Other embodiments of the invention use three-dimensional dimension cells for air travel or one dimensional cells for road travel and are more fully described in the above referenced application.

The first level of the hierarchy is called a "minicell". As shown in FIG. 1, minicells 11, 13, 15, for example, having radius R1, are relatively small and measured in one to a few hundreds of feet. The aim in constructing the size of the minicell is to have a single machine in a minicell. Thus, for an oil tanker, the minicell size could be on the order of 500 to 1000 feet, approximately the length of the tanker. In areas of the remote ocean with a large spacing between tankers, the minicell size could be somewhat larger. If two machines are occupying the same minicell, they have effectively collided. As the machines move through space, they continually determine their position via GPS and determine which minicell they are in by reference to a minicell directory or formula.

The next level of the hierarchy is called a "group cell". A semispherical collection of minicells forms a group cell 17, having radius R2. The group cell diameter is set to help organize the minicells by region and may be associated with a unique frequency used by minicells within the group cell. The number of minicells within a respective group cell will depend therefore on the size of the minicells and the strength of the TCELL transmitter.

The highest level is called a "giant cell" 19. A group cell and all of its immediate neighbors forms a giant cell with a radius of 3*R2. In the diagram, the each giant cell is comprised of 7 group cells, although this can differ depending on the base shape used for the cells. Further, the base shape for the minicell can be different from that used for the group and giant cells. In this application, the size of the giant cell is adjusted to be somewhat smaller than the size of the entire fleet. Thus, the TCELL transmitter should have an effective range equivalent to the size of the giant cell. Within each giant cell, each minicell is linearly enumerated and mapped onto a small time slice in an n second repeating unit of time exactly specified by the GPS clock. The small time slice is at least the amount of time that a signal would propagate across a giant cell. For a 20 mile giant cell this time would be slightly more than 100 microseconds. Thus, the minicell in which the vehicle finds itself in determines when the vehicle is allowed to transmit its location data.

Each oil tanker 21, 23, 25, 27 has a weak TCELL transmitter capable of transmitting a signal approximately with a range of 2*R2 to a receiver of a specified sensitivity. That is, in the optimal situation only machines within the immediate group cell can receive the signal. For some applications, the TCELL system can be reduced in cost by eliminating the TCELL receiver at each mobile machine. Only a central command center 29 would have a very sensitive TCELL receiver. A central command center for example could be located at an oil rig which would be used to keep the oil tankers at appropriate distances from the oil rig as well as other tankers. However, since many applications of the invention will have the mobile machine cluster voyaging far from a control center, unless the center travels with the cluster, it is generally preferred that each mobile machine be equipped with a TCELL receiver. Each TCELL transmitter sends a burst of data during the time slice and on the frequency determined by its location, i.e. which minicell it is in. In other embodiments of the invention, each vehicle will also have a TCELL receiver for listening for signals from other vehicles in the surrounding ocean surface. The vehicle receiver can also be designed to filter out signals below a certain signal strength threshold to improve the discrimination of close and far vehicles.

As will be appreciated by the skilled practitioner, the size of the minicell is a factor of the vehicle characteristics such as size and speed as well as the number of minicells in giant cell. The size of the minicell is also strongly influenced by the propagation time for the TCELL signal across a giant cell and the number of channels used by TCELL system. Each minicell within a given giant cell is allotted a time slice of an overall repeating time period. The time slice must be large enough for each transmitter to transmit the required information and allow the signal to propagate the diameter of a giant cell. Where multiple frequencies are used, the time slices allocated to each frequency are independent of although comparable in duration to the time slices allocated for any other frequency. In the multiple frequency case, minicells within the same giant cell will use the same time slice on different frequencies. Therefore, there can not be too many minicells within a giant cell.

One skilled in the art will appreciate that operating parameters can vary as will be shown in some alternative embodiments below. However, for a preferred embodiment in which oil tankers transmit at a frequency of 2–50 MHz, an appropriate minicell size is 500–1000 feet in diameter. The group cell size could range from 1 to 5 square miles in area and the giant cell size is 15 miles in diameter, 225 square miles. This translates into 22500 minicells being in a giant cell. Figuring a periodicity of 6 minutes between transmissions for a particular machine, this allows 16 microseconds for each TCELL transmitter to send a 150 bit message on one channels. Within its allotted time slot, each vehicle can transmit its vehicle ID, vehicle type, location, direction of travel and speed, and the frequency to which its audio receiver is tuned. Any other TCELL receiver in the area listening to TCELL transmissions can thus determine the location of the vehicle.

In other embodiments of the invention, further separation of signal by having vehicles within a given giant cells transmit at different frequencies is unnecessary. Where there are a relatively large number of minicells and a requirement that each machine signal at a relatively high rate, there will be a greater need to use more frequencies. Where there are fewer minicells and the vehicles do not need to transmit often, a single frequency can be used. Furthermore, although the specification of weak transmitters allows for an inexpensive system, a weak transmitter, i.e. one which can transmit only across a group cell, is not a necessary feature of the invention. With stronger transmitters, vehicles within one giant cell can transmit at a different frequency than those within a second giant cell. As the vehicle goes from giant cell to giant cell, the TCELL transmitter and possibly receiver as well will automatically switch to respectively transmitting and listening at the appropriate frequencies.

In embodiments having a central controller, the respective receivers within a TCELL system may have different sensitivities. That is, TCELL receivers for a central monitoring facility may elect to receive more TCELL transmitters, possibly at different frequencies, than the TCELL receivers in the machines themselves. The TCELL receiver for the central control authority 29 may elect to receive across a greater area and number of frequencies to obtain a greater picture of the area under its control. As the transmitting frequencies may be restricted for TCELL use, the TCELL receiver for the control center 29 may simply be more sensitive or set to a lower signal threshold than the machine TCELL receivers to obtain a greater range of information.

As the cluster travels, each mobile machine 21, 23, 25 and 27 (or possibly a central authority 29) will monitor the distribution of vehicles or machines and match the actual distribution against a desired distribution. The distribution can be expressed as an average number of vehicles in a given neighborhood, the distance of vehicles from a set of points in the ocean surface, the distance of vehicles from each other, or any number of different measurements. Generally speaking the mobile machine will be measuring its location relative to its immediate neighbors in the cluster. If the distribution is sufficiently close to the desired distribution, the TCELL system merely continues monitoring the movement of the cluster of machines. If the distribution is not within desirable parameters, actions are taken. In the case of an oil tanker fleet, it is most likely that the operators of individual tankers will be alerted when the actual distribution of tankers is not optimal. This can be done in a variety of ways, including visual alerts on a display or audio alerts. Optionally, the command center process will determine what is wrong with the distribution and how it can be most easily rectified. This set of suggestions can be presented to the operator in textual form on a computer display.

In the alternative, the TCELL process can automatically generate messages to the controls of the wandering vehicle. Supposing that the tankers were on autopilot, driven by robots, the TCELL system can directly issue the needed commands to the errant machines to correct the total distribution. The commands can be issued from the TCELL system in the mobile machine itself or from a central command center. In the case of the oil tanker fleet, commands would be issued to the steering and propulsion controls to cause the tanker to assume its proper place in the cluster.

The reader will note that the invention may be described in terms of listening, selecting, comparing, determining or other terms that could be associated with a human operator. The reader should remember that the operations which form the invention are machine operations processing electrical signals to generate other electrical signals.

Figure 2A:
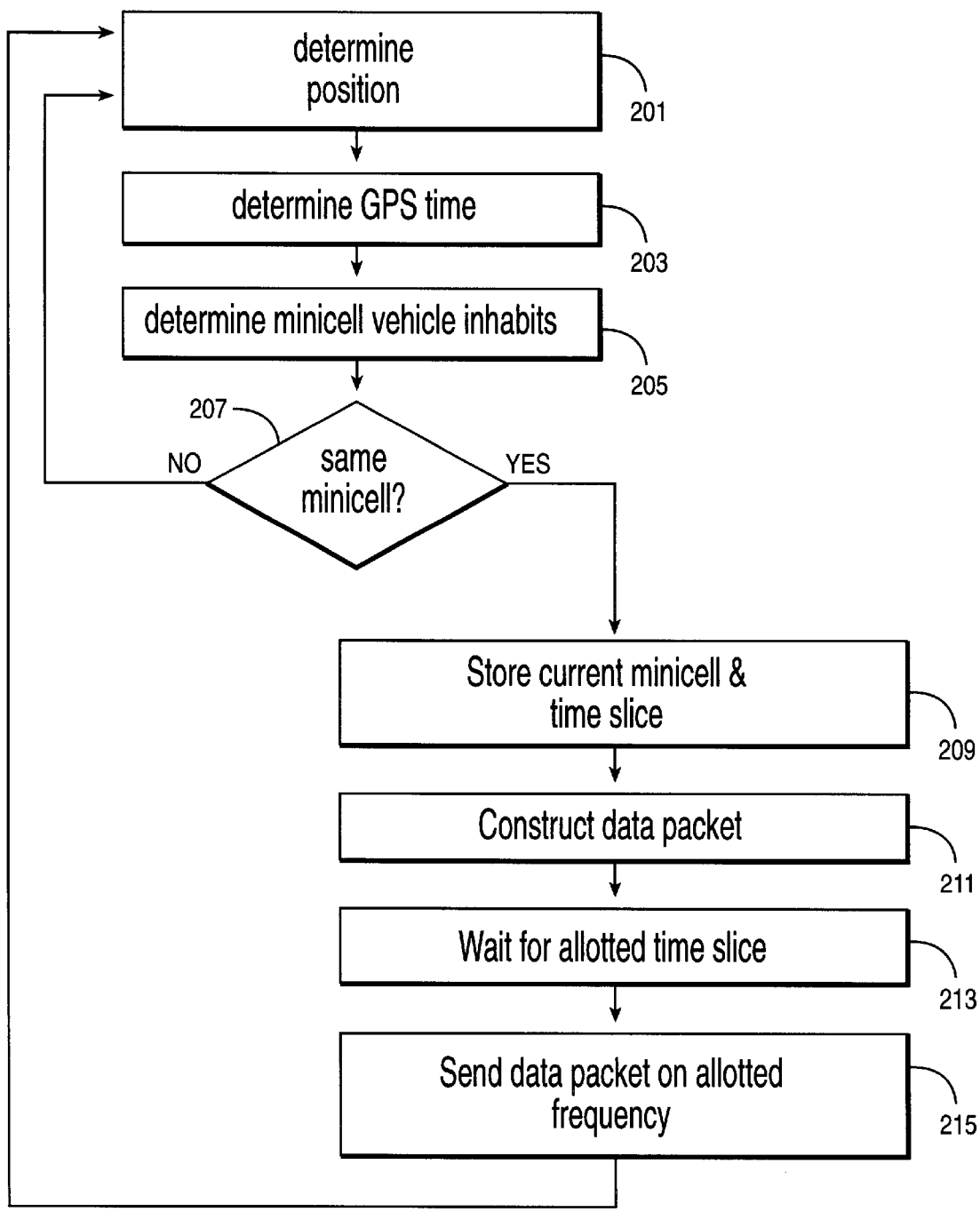
FIG. 2A is a flow diagram for transmitting the location of a machine according to the present invention.

In FIG. 2, a flow diagram of the transmission procedure for a TCELL transmitter located at a respective vehicle is shown. The transmission procedures at each machine are similar; they will typically vary according to cell size, time slice and assigned frequency, but are otherwise similar. In step 201, the TCELL system in the vehicle determines its position, e.g., latitude, longitude (and altitude if flying machines are being controlled) using a GPS receiver. If a differential GPS system is used, a high accuracy in position is usually attained.

At step 203, the TCELL system determines the GPS time as defined by the signal received from the GPS satellites. At step 205, the TCELL system determines which minicell it is in by reference to the minicell directory or minicell formula and its calculated position. Preferably, the minicell directory and formula are an integral parts of the TCELL system. However, in the event of changes to the minicell system or in an area for which the TCELL system does not have a directory, it can be downloaded from a central authority. Generally, this would occur over a wireless transmission medium. Also, from the minicell directory or formula, the TCELL system would determine the time slice and frequency in which it was allowed to transmit. For reasons of minimizing memory requirements, the use of a minicell formula is preferred.

In step 207, a test is performed to determine whether the calculated minicell varies from the last calculated minicell by a predetermined amount. In general, the machine should be in the same or a proximate minicell from the last reading. If the minicell varies by more than the predetermined amount, the process cycles back to confirm the reading. In step 209, the current minicell and time slice are stored.

In step 211, a TCELL message is constructed. The message comprises data such as vehicle ID and type, XYZ position, heading, speed, frequency that the audio receiver of the vehicle is tuned and a check sum for error correction. At step 213, the TCELL transmitter waits until its allotted time slice occurs. At step 215, the TCELL message is sent during the allotted time slice for the minicell. The process returns to step 201 where the vehicle's position is updated according to the signals received by the GPS receiver.

One minicell formula for a three dimensional embodiment is shown in FIG. 2B. As is shown, the cell number of the minicell is a function of the x coordinate, the y coordinate and the Z coordinate as well as the dimensions of the giant cell and number of minicells in the giant cell. Using the calculated cell number divided by the number of time slots available in the giant cell the remainder is used to calculate the time slot number. However, this formula is merely illustrative. Many other minicell formulas can be devised and used by the present invention.

Figure 3:
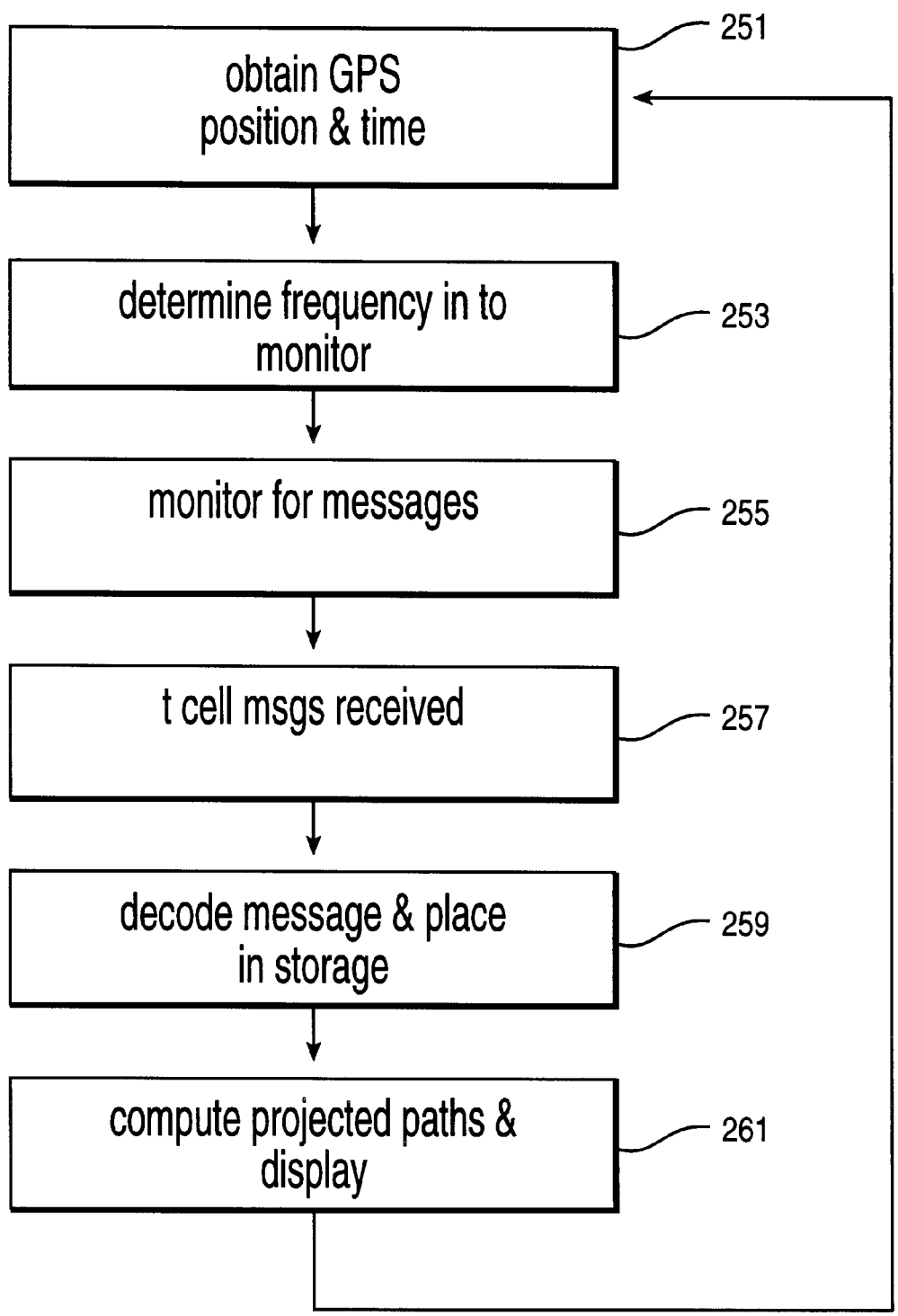
FIG. 3 is a flow diagram for receiving the transmitted location messages from a plurality of machines operating within the hierarchically divided space.

FIG. 3 is a flow diagram for receiving the transmitted location messages from a plurality of vehicles operating within the hierarchically divided space. Each vehicle can not only contain the TCELL transmitter, but also a TCELL receiver. For tracking purposes, only a single TCELL receivers can be used in the overall system. In the event of an undesirable distribution, the control center can issue the needed instructions over the audio channel (included in the TCELL messages).

Next, a monitoring step 255 is entered. It monitors for TCELL messages across the entire time period for the giant cell in which the TCELL receiver is located for a given number of periods. Next, in step 257, a TCELL message is received. In step 259, the message is decoded and the data therein is placed in the vehicle tracking database, including the vehicle ID, vehicle type, position, bearing and speed. Although not shown, error checking using the check sum or checking the time slice in which the TCELL message was received against the information in the message can be performed at this time.

The information in the vehicle tracking database is used to generate a display to the operator of the TCELL system, step 261. After a predetermined number of time periods has elapsed, the process returns to step 255 to monitor and calculate the vehicles' positions.

Figure 4:
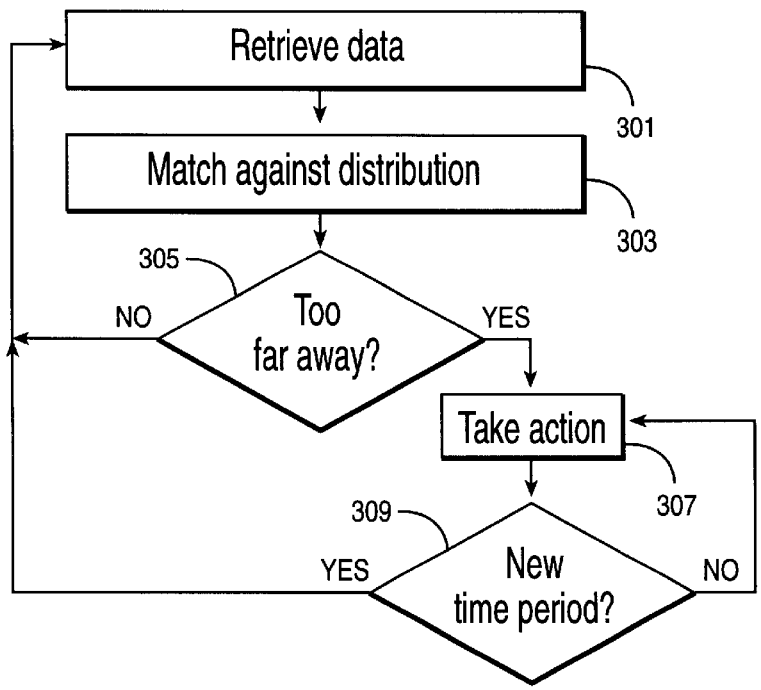
FIG. 4 is a flow diagram for issuing commands to the machines to maintain a desired distribution.

FIG. 4 is a flow diagram for issuing commands to the machines to maintain a desired distribution. In step 301, the data from the tracking database is retrieved. The distribution of the detected vehicles is matched against a desired distribution in step 303. As mentioned above, the distribution can be expressed in many different ways including distance from another machine or distance from a set of points and so forth. The distribution can be uniform across the ocean surface, land surface or airspace or have pockets of concentration to meet special needs. The distribution can assign specific machines to specific points in the cluster, or be more generalized so that any machine can be present in any part of the cluster. A set of different distributions can be stored depending on how many active units there are at a given time.

Although there are a variety of acceptable matching algorithms, one could create a map of all the units in the group. Using a circle sufficient large to include 4 to 5 machines, the circle would scan the detected fleet positions to detect density with respect to the center of the circle. The scan can take the form of an array of rectilinearly ordered points. If the values show an even distribution, the density is acceptable. Otherwise a machine near an area with too low a density would receive commands to move toward that point. If an area is too dense, the commands would shift ships away from that point.

Furthermore, the constraint on how closely the detected distribution must match the desired distribution will also vary according to the application. As one example, in a cluster of ten oil tankers in cluster reaching 90 miles in length, a distribution of a tanker of every ten miles might be desired. The threshold levels for action might be if the distance between tankers is greater than 2.5 miles or less than 1.5 miles.

If the distribution of the machines fall too far from the desired distribution, step 305, action is taken. If the detected distribution is within tolerable boundaries, the process returns to the monitoring step. The action taken in step 307 is highly dependent on the particular implementation of the invention. If the machines are human driven, it is likely that the actions will be alerts to a user interface at a central command center or to the errant vehicle. If the machines are robots, commands from a central control center will direct the robots where to go.

The process will return to step 301 once a new time period has begun, step 309.

Figure 5A:
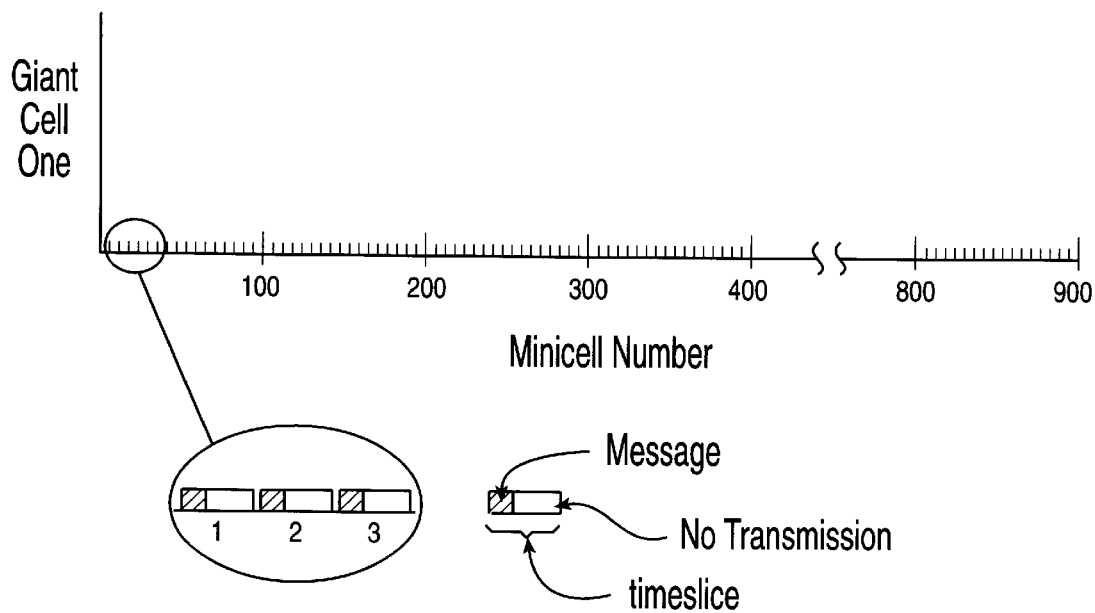
FIGS. 5A and 5B are diagrams showing the allotted time slices for respective minicells with a two dimensional hierarchy.
Figure 5B:
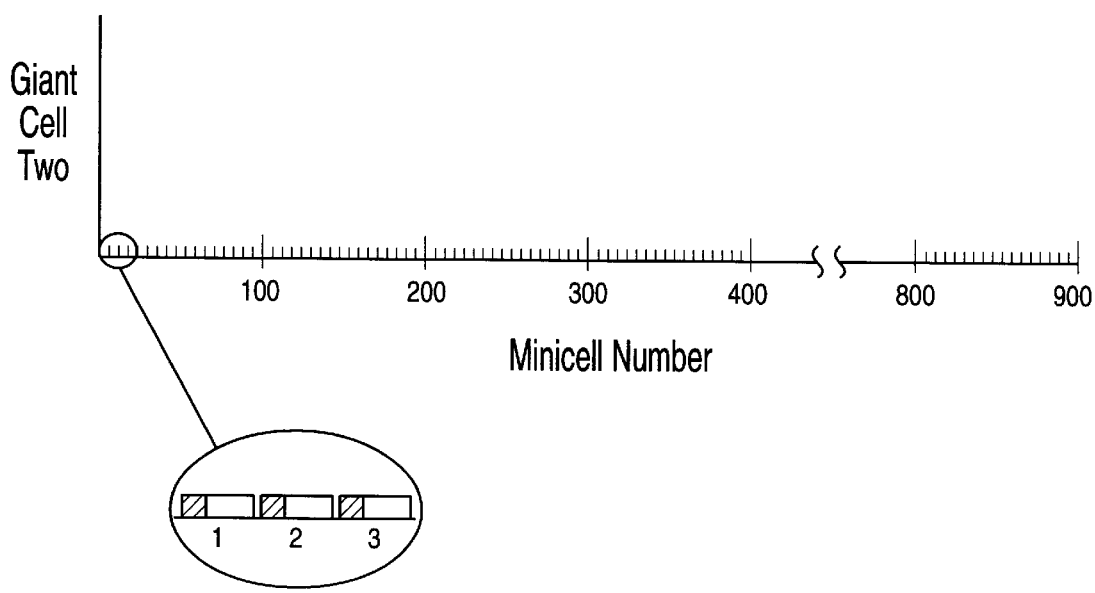

FIGS. 5A and 5B shows the allotted time slices for two adjacent giant cells. Each giant cell contains 900 minicells which for the sake of illustration are allotted time slices in numeric order on a single frequency. However, as those skilled in the art would recognize other orders and addition frequencies are possible. The reader can imagine that each giant cell contains nine group cells arranged in a two dimensional plane each of which contains 100 minicells. Within each giant cell, the group cell to the northwest contains minicells 1–100 numbered left to right, the group cell due north contains minicells 101–200, the group cell to the northeast contains minicells 201–300 and so forth. Minicell 1 in giant cell 1 has the same time slice as minicell 1 in giant cell 2 and so forth.

Although not illustrated, the transmitters in each group cell could use one of nine different frequencies so that the interval between each time slice allotted to a minicell can be reduced. In this case, within each giant cell, minicells 1, 101, 201, 301, 401, 501, 601, 701, 801 and 901 would transmit during the same time slice albeit at different frequencies.

Figure 6:
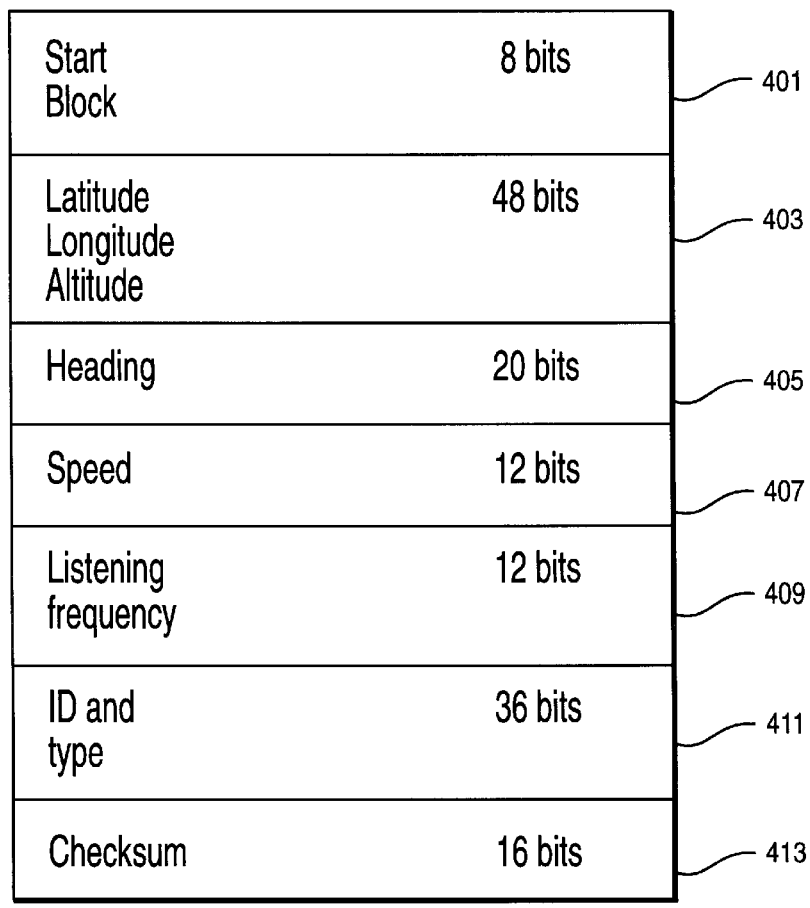
FIG. 6 shows a sample message for one embodiment of the invention.

FIG. 6 shows a sample message for the vehicle embodiment of the invention. In this example, the message is 152 bits long. With a transmission of 9600 baud, the message takes approximately 16 milliseconds to transmit. The TCELL system requires some time to transition from the listening to transmitting mode so a start block 401 of eight bits is included. The next 48 bits 403 includes position information. The next 20 bits 405 includes the heading data. One skilled in the art would readily appreciate the position and heading information can be expressed in a variety of different ways. The next 8 bits 407 includes the speed data. Next, 12 bits 409 are used for the audio frequency data representing the audio frequency at which the vehicle can be contacted. The next 40 bits 411 are used for transmission of additional data such as the vehicle ID and vehicle type as may be required. The checksum used for error checking is stored in the last 16 bits 413. One skilled in the art would recognize that other data depending on the particular application of the invention, i.e. the type of machines being controlled could be transmitted within the TCELL message.

One skilled in the art would appreciate that the message format could vary according to the needs of the particular implementation of the TCELL system. For example, the message can be shortened to include only a start block and the vehicle ID. The time slice itself represents a particular minicell so the time at which the message is received can be used to determine the machine's position with 30–100 meters depending upon the type of GPS used. The machines' heading and speed can be calculated from successive messages. Since the vehicle type and the audio frequency may be standard within the system, this data does not necessarily need to be transmitted. Finally, error checking using the check sum is not strictly necessary. Shortening the message allows the potential of shortening the time slice and thus increasing the periodicity at which each machine can broadcast its position.

Figure 7:
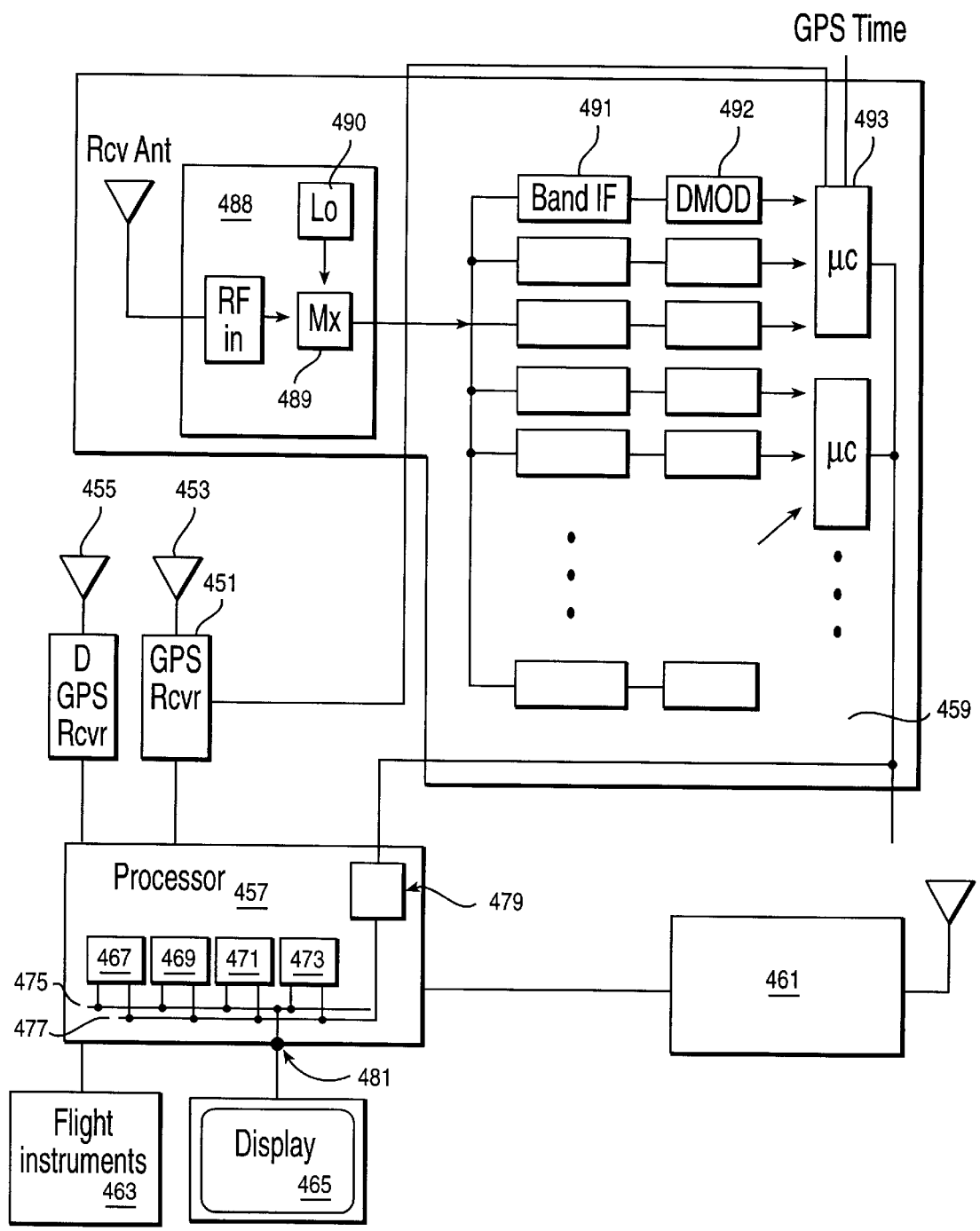
FIG. 7 is a block diagram of the TCELL system suitable for an air, land or sea machine.
Figure 7:
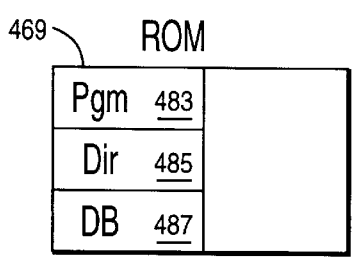

FIG. 7 is a block diagram of the TCELL system suitable for a vehicle. As shown in the figure, a GPS receiver 451 includes GPS antenna 453 and possibly a differential GPS antenna 455 is coupled to the TCELL processor 457. As mentioned above, the GPS receiver 451 may have other inputs from a barometric altimeter (not shown). The GPS receiver 451 and TCELL processor 457 communicate position and time information. The TCELL processor 457 is in turn coupled to the TCELL receiver 459 and TCELL transmitter 461. The TCELL processor 457 is also coupled to the controls 463 which provide heading and velocity information. Optionally, this information can be established from calculations using the GPS position and time data. The TCELL processor 457 is also coupled to a display 465 which presents a user interface to the operator of the vehicle.

The TCELL processor 457 comprises a microprocessor 467, RAM and/or ROM 469, persistent memory 471 and a timer circuit 473 all coupled to and communicating via a data bus 475 and an address bus 477. Communication with the TCELL receiver 459 and TCELL transmitter 461 is accomplished by means of a serial I/O interface 479. Control of the display 465 is performed by a video adapter 481. The timer circuit 473 which keeps track of the time slots is fed the time data from the GPS receiver 451.

The RAM 469 contains the TCELL program 483, cell directory and/or formula 485 and the vehicle tracking database 487. The TCELL program 483 receives the data from the GPS receiver, TCELL receiver and other inputs, analyzes the data, constructs a TCELL message and instructs the TCELL transmitter when to send the TCELL message. In a multiple frequency embodiment, the TCELL receiver has a front end 488 with a mixer 489 and a local oscillator 490 which picks up a band of frequencies, e.g., a 100 kHz bandwidth on a MHz band carrier. Assuming that there are 10 channels, each channel has a tuner, a bandwidth IF 491, which is tuned to a respective 10 kHz band. This is coupled to a demodulator 492 which is in turn coupled to a microcontroller 493. Each microcontroller 493 processes the TCELL signals received on the channel for use by the TCELL processor 457.

The TCELL system shown above can be simplified a great deal in different implementations of the invention. For example, the system at the vehicle does not require the TCELL receiver or display. These functions can be present only in the central command center.

As described above, the preferred embodiments of the invention are a system programmed to execute the method or methods described herein, the methods themselves and a computer program product. The sets of instructions which comprise the computer program product are resident in a random access memory of one or more systems as described generally above during execution. Until execution, the sets of instructions can be stored in another type of memory such as flash memory, hard disk or CD-ROM memory. Furthermore, the sets of instructions can be stored in the memory of another computer and transmitted to the system when desired by a wired or wireless network transmission medium. The physical storage or transmission of the sets of instructions change the medium in which they are resident. The change may be electrical, magnetic, chemical or some other physical change.

While the present invention, its features and advantages have been described with reference to certain illustrative embodiments, those skilled in the art would understand that various modifications, substitutions and alterations can be made without departing from the scope and spirit of the invention. Therefore, the invention should be not construed as being narrower than the appended claims.

We claim:

1. A method for maintaining a desired distribution of a moving cluster of machines, comprising the steps of:

at each machine, determining a location of the machine via a global positioning system calculation;

at each machine, determining a cell corresponding to the determined location;

at each machine, broadcasting a message at a time slice allocated for the cell;

receiving broadcasted messages from a plurality of machines;

using the received broadcasted messages to determine the locations of the plurality of machines;

matching the determined locations of the machines against a desired distribution of machines within the cluster;

responsive to a finding that the determined locations do not adequately match the desired distribution, issuing commands to respective machines to bring the cluster into compliance with the desired distribution.

2. The method as recited in claim 1 wherein the machines in the moving cluster are moving in substantially a same direction.

3. The method as recited in claim 1 wherein each machine location in the moving cluster is measured with respect to adjacent machines in the moving cluster.

4. The method as recited in claim 1 wherein commands are issued to an autopilot to bring the cluster in to compliance with the desired distribution.

5. The method as recited in claim 1 wherein each cell is a member of a group cell and each cell within a group cell is allocated a different periodic time slice in which to broadcast a message and wherein respective cells within different group cells are allocated the same periodic time slice.

6. A cluster of machines which maintain a desired distribution within the moving cluster of machines, comprising:

at each machine, means for determining a location of the machine via a global positioning system calculation;

at each machine, means for determining a cell corresponding to the determined location;

at each machine, means for broadcasting a message at a time slice allocated for the cell;

means for receiving broadcasted messages from a plurality of machines;

means for using the received broadcasted messages to determine the locations of the plurality of machines;

means for matching the determined locations of the machines against a desired distribution of machines within the cluster;

means responsive to a finding that the determined locations do not adequately match the desired distribution for issuing commands to respective machines to bring the cluster into compliance with the desired distribution.

7. The cluster as recited in claim 6 wherein the machines in the moving cluster are moving in substantially a same direction.

8. The cluster as recited in claim 6 wherein each machine location in the moving cluster is measured with respect to adjacent machines in the moving cluster.

9. The method as recited in claim 6 wherein commands are issued to an autopilot to bring the cluster in to compliance with the desired distribution.

10. The method as recited in claim 6 wherein each cell is a member of a group cell and each cell within a group cell is allocated a different periodic time slice in which to broadcast a message and wherein respective cells within different group cells are allocated the same periodic time slice.

11. A computer program product in a computer readable medium for maintaining a desired distribution within the moving cluster of machines, comprising:

means for determining a location of the machine via a global positioning system calculation;

means for determining a cell corresponding to the determined location;

means for broadcasting a message at a time slice allocated for the cell;

means for receiving broadcasted messages from a plurality of machines;

means for using the received broadcasted messages to determine the locations of the plurality of machines;

means for matching the determined locations of the machines against a desired distribution of machines within the cluster;

means responsive to a finding that the determined locations do not adequately match the desired distribution for issuing commands to respective machines to bring the cluster into compliance with the desired distribution.

12. The product as recited in claim 11 wherein the machines in the moving cluster are moving in substantially a same direction.

13. The product as recited in claim 11 wherein each machine location in the moving cluster is measured with respect to adjacent machines in the moving cluster.

14. The product as recited in claim 11 wherein commands are issued to an autopilot to bring the cluster in to compliance with the desired distribution.

15. The product as recited in claim 11 wherein each cell is a member of a group cell and each cell within a group cell is allocated a different periodic time slice in which to broadcast a message and wherein respective cells within different group cells are allocated the same periodic time slice.

* * * * *